United States Patent [19]

Kaida et al.

[11] Patent Number: 4,540,456

[45] Date of Patent: Sep. 10, 1985

[54] FILM HANDLING METHOD

[75] Inventors: Shinichi Kaida; Kaoru Uchiyama, both of Kanagawa, Japan

[73] Assignee: Fuji Photo Film Co., Ltd., Kanagawa, Japan

[21] Appl. No.: 629,291

[22] Filed: Jul. 9, 1984

[30] Foreign Application Priority Data

Jul. 7, 1983 [JP] Japan ................................ 58-123936

[51] Int. Cl.[3] .............................................. B32B 31/18

[52] U.S. Cl. .................................... 156/159; 156/258; 156/304.1; 156/364.3; 156/505; 156/506

[58] Field of Search ..................... 156/157, 159, 304.1, 156/304.3, 505, 506

[56] References Cited

U.S. PATENT DOCUMENTS

| | | | |
|---|---|---|---|
| 3,345,238 | 10/1967 | Vanoni | 156/505 |
| 3,841,934 | 10/1974 | Rosborough et al. | 156/505 |

*Primary Examiner*—Caleb Weston

*Attorney, Agent, or Firm*—Sughrue, Mion, Zinn, Macpeak and Seas

[57] ABSTRACT

A film processing method for removing troubled film strips from a series of film strips to which it is spliced for processing. The troubled film strip is removed by cutting along a line located inwardly of a leading end of the troubled film strip by a distance at least equal to the width of a splicing tape from a center line of the splice between the leading end of the troubled film strip and a preceding film strip such that a part of the troubled film strip remains connected to the preceding film strip. A succeeding film strip, or another film strip, is then spliced to the remaining part of the troubled film strip.

4 Claims, 2 Drawing Figures

FILM HANDLING METHOD

BACKGROUND OF THE INVENTION

The present invention relates to film processing methods, and more particularly, to a film processing method whereby, after plural exposed films in the form of film strips are extracted from their film cartridges and spliced together into a continuous series for developing, etc., troubled film strips having defects such as rips and broken perforations are detected and removed from the continuous series without adversely affecting the other film strips.

Before exposed film strips are subjected to developing or the like, it is necessary to splice them into a continous series of film strips. When a troubled film strip is found in the continuous series, it is necessary to remove it without adversely affecting the remaining film strips. Doing so, however, results in several problems.

First, when a troubled film strip is removed by cutting the splices formed at both ends thereof with splicing tape or the like and the remaining film strips are spliced together, the rear end portion of the preceding film strip is shortened by half the width of the splicing tape.

Secondly, removal of the splice formed by using splicing tape or the like makes it impossible to perform film identification. That is, before exposed film strips are subjected to developing or the like, it is essential to establish positive correlation between the film strips and customers. For this purpose, a method has been employed in which, in association with the film splicing operation, the same identification codes as those provided on DPE envelopes which identify the customers are printed on the not-exposed rear end portion of the film strips. Alternatively, a method has been employed in which the identification code of a film strip is marked on the splicing tape which is used for splicing each film strip to the succeeding film strip. However, in a series of film strips including troubled film strips, in both of these methods, the correlation for each film strip preceding each removed film strip is lost. That is, in the case where the method of printing indentification codes on the rear end portions of film strips is employed, when remaining film strips are spliced, the rear end portion of a film strip preceding a removed film strip is covered by the splicing tape, and in the case where the method of marking identifications codes on splicing tape is employed, the splicing tape on which the identification code was marked is cut and removed.

SUMMARY OF THE INVENTION

In view of the foregoing, an object of the invention is to provide a film processing method in which the above-described difficulties accompanying conventional film processing methods are eliminated, and when a troubled film strip is found in a series of film strips spliced together, the troubled film strip can be removed without adversely affecting the remaining film strips.

The foregoing and other objects on the invention have been achieved by the provision of a film processing method in which a troubled film strip spliced to the preceding film with splicing tape is removed, whereby, according to the invention, the trouble film strip is removed by cutting along a line located inwardly of the troubled film strip at least by a distance equal to the width of the splicing tape from the center line of the splice between the troubled film strip and the preceding film strip so that a part of the troubled film strip remains connected to the preceding film strip. The following film strip is then spliced to the remaining part of the troubled film strip.

DESCRIPTION OF THE PREFERRED EMBODIMENTS

A preferred embodiment of the invention will be described with reference to the accompanying drawings.

Figure 1:
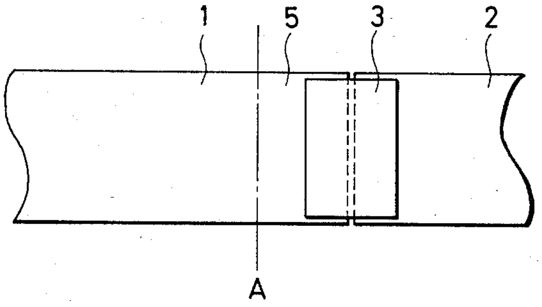
FIGS. 1 and 2 are plan views showing troubled-film treating states in a method of the invention.

FIG. 1 is a plan view used for a description of a troubled-film strip treating condition. In FIG. 1, reference numeral 1 designates a troubled film strip; 2, a film strip preceding the troubled film strip 1; and 3, a segment of splicing tape.

A troubled film-strip removing operation, that is, an operation of cutting the junction of the troubled film strip 1 and the film strip 2 will be described with reference to FIG. 1. As described above, a film strip generally has a relatively long leader as its front end portion. Taking advantage of this fact, the junction of the troubled film strip 1 and the preceding film strip 2 is cut along a cutting line A. The cutting line A is located inwardly of the troubled film strip 1 by a distance at least equal to the width of the splicing tape segment 3 from the center line of the junction of the troubled film strip 1 and the preceding film strip 2.

Since the film strip is cut along the cutting line A as decribed above, the rear end portion of the preceding film strip is not shortened at all, and has a splicing film part 5 which is as long as at least half the width of the splicing tape segment 3 and is formed by utilizing the front end portion of the troubled film strip 1. This is one effect of the invention. What is shortened by the cutting is the front end portion of the troubled film 1, which causes no problem because the front end portion is a leader, as described before.

Figure 2:
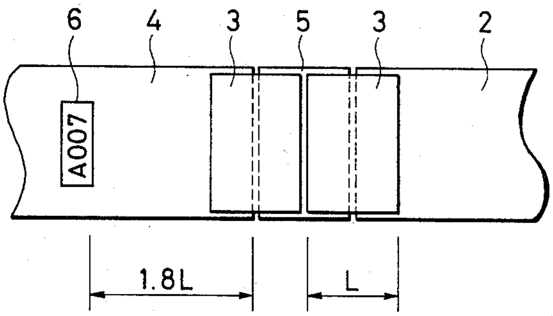

After the troubled film strip 1 has been removed by the above-described operation, the splicing film part 5 which is connected to the rear end of the preceding film strip 2 and is formed from the front end portion of the troubled-film strip is connected to another film strip or a succeeding film 4 with a splicing tape segment 3. Thus, the troubled-film removing operation has been accomplished. As shown in FIG. 2, the film strip series from which the troubled film strip has been removed has substantially no portion shortened.

A film identifying method employed with the troubled-film removing operation of the invention will be described.

In order to determine which film strip belongs to which customer, identifying codes are printed or stamped on the film strips, as described above. As is apparent from the above description, in the case where the inventive troubled-film removing operation is carried out, the method of printing an identifying code on the rear end portion of a film strip can be employed. However, the method of stamping the identifying code of the preceding film strip on the splicing tape cannot be employed because the identifying code thus stamped is removed.

After being developed, the film strips are separated from one another by cutting. In this case, in general, the junctions are removed. The aforementioned method of printing an identifying code on the rear end portion of film strips suffers from the difficulty that, if the rear end portion of a film strip is exposed to light for some reason, it is impossible to identify the film later. Accordingly, it can be understood that a method suitable for applying an identifying code to a film strip is a method in which a film identifying code can be marked at a position on the film which is located inwardly of the cutting line selected in the above-described troubled-film removing operation.

One example of such a method is a method of using so-called "check labels", which is well known in the art. What is important is that, in order for the identifying code to not be affected when the film is cut and spliced again, the position of the code must be located at a distance at least 1.5 times the width of the splicing tape inwardly of the cut end of the film.

FIG. 2 illustrates a film splicing method according to the above-described principle. In FIG. 2, reference numeral 6 designates a check label. The position of the check label 6 is located inwardly of the film; more specifically, it is positioned 1.8 times the width of the splicing tape segment 3 from the center line of the splice.

In the above-described embodiment, the film strip which is spliced after the removal of the troubled film strip is assumed to be a normal film strip. However, if a series of film strips includes a plurality of troubled film strips in a row, then a series of splices must be formed after the troubled film strips have been removed.

As is apparent from the above description, in a film processing method for removing a troubled film strip from a series of film strips, according to the invention, the troubled film strip is removed by cutting along a line located inwardly of the troubled film strip by a distance at least equal to the width of the splicing tape from the center line of the splice of the troubled film strip and the preceding film strip, and the succeeding film strip is spliced to the part of the troubled film strip which has been left at the end of the splice in the cutting operation. Thus, in the film processing method according to the invention, troubled film strips can be removed without adversely affecting the other film strip.

We claim:

1. In film processing method in which a troubled film strip spliced to a preceding film with a splicing tape is removed, the improvement wherein said troubled strip is removed by cutting along a line located inwardly of a leading end of said troubled film strip by a distance at least equal to the width of said splicing tape from a center line of a splice between said troubled film strip and a preceding film so that a part of said troubled film strip remains connected to said preceding film strip; and a succeeding film strip is spliced to said part of said troubled film strip.

2. The film processing method of claim 1, wherein said line is located inwardly of said leading end of said troubled film by a distance of less than twice said width of said splicing tape from said center line of said splice.

3. The film processing method of claim 1, wherein each film strip is marked with a check label located at a position a distance of at least 1.5 times said width of said splicing tape from said center line of said splice.

4. The film processing method of claim 3, wherein said check label is located at a position a distance of approximately 1.8 times said width of said splicing tape from said center line of said splice.

* * * * *